Figure 1:
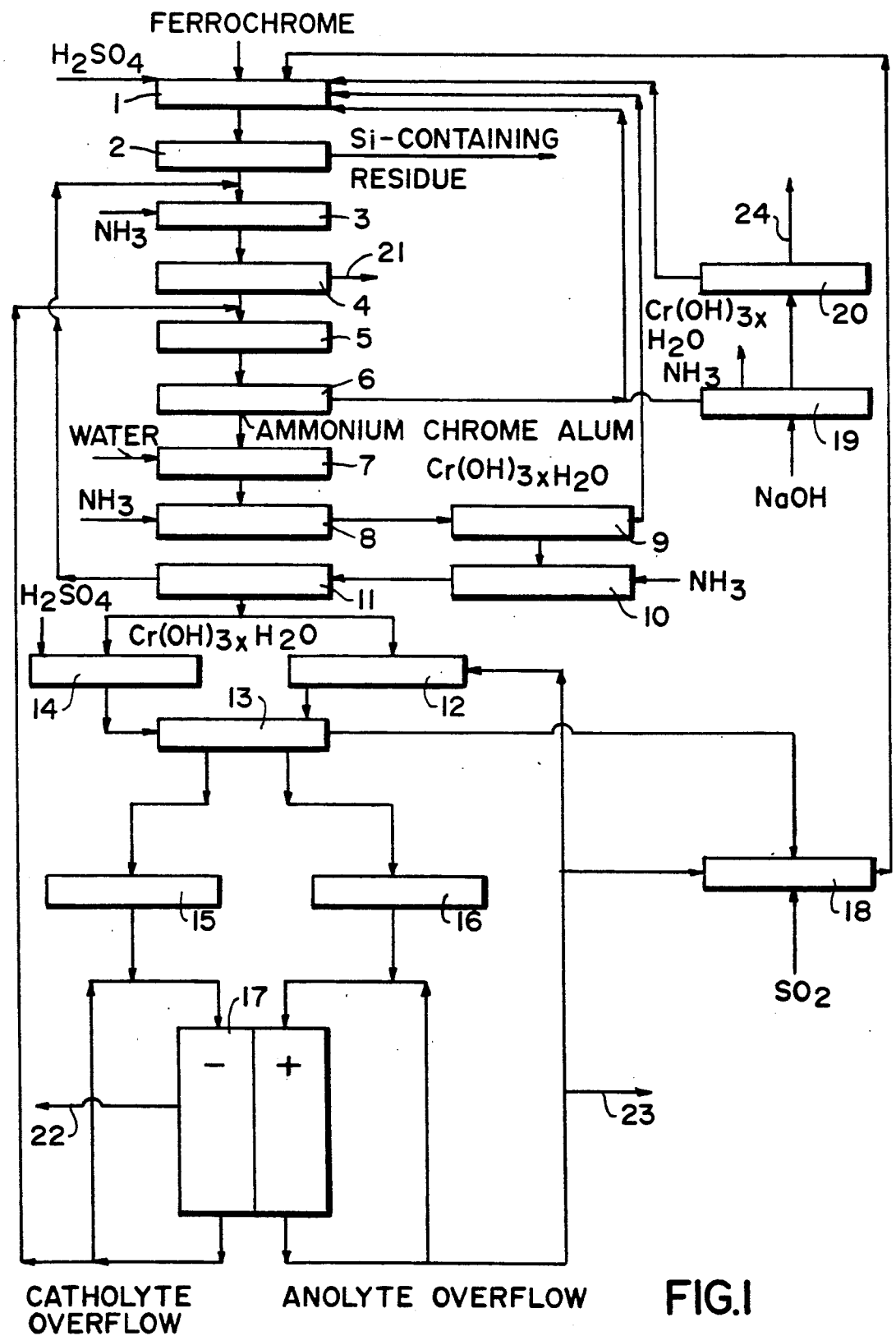

United States Patent [19]

Lönhoff et al.

[11] Patent Number: 5,096,548

[45] Date of Patent: Mar. 17, 1992

[54] PROCESS FOR THE PREPARATION OF CHROMIC ACID

[75] Inventors: Norbert Lönhoff, Leverkusen; Ludwig Schmidt, Krefeld; Hans-Dieter Block, Leverkusen; Rainer Weber, Leverkusen, all of Fed. Rep. of Germany

[73] Assignee: Bayer Aktiengesellschaft, Leverkusen, Fed. Rep. of Germany

[21] Appl. No.: 626,076

[22] Filed: Dec. 11, 1990

[30] Foreign Application Priority Data

Dec. 16, 1989 [DE] Fed. Rep. of Germany ....... 3941569

[51] Int. Cl.$^5$ .............................................. C25B 1/14
[52] U.S. Cl. ......................................... 204/89; 204/97
[58] Field of Search .......................... 204/89, 97, 51

[56] References Cited

U.S. PATENT DOCUMENTS

| | | | |
|---|---|---|---|
| 1,739,107 | 12/1929 | Udy | 204/97 |
| 1,928,294 | 9/1933 | Liebreich | 204/97 |
| 2,601,306 | 6/1952 | Lloyd et al. | 204/89 |
| 2,771,413 | 11/1956 | Dean et al. | 204/89 |
| 3,595,765 | 7/1971 | Joo | 204/89 |
| 3,983,016 | 9/1976 | Ellsworth et al. | 204/89 |
| 4,273,628 | 6/1981 | Kidon et al. | 204/97 |

FOREIGN PATENT DOCUMENTS

| | | |
|---|---|---|
| 739447 | 8/1979 | Canada . |
| 62-047436 | 3/1987 | Japan . |
| 2082696 | 2/1982 | United Kingdom . |

OTHER PUBLICATIONS

Ullmann's Encyclopedia of Industrial Chemistry, Fifth, Completely Revised Edition, vol. A7, pp. 67-81.
Electrowinning Chromium Metal by J. B. Rosenbaum, 1957.

*Primary Examiner*—John Niebling
*Assistant Examiner*—Arun S. Phasge
*Attorney, Agent, or Firm*—Sprung Horn Kramer & Woods

[57] ABSTRACT

A process for the production of chromic acid, comprising
(a) dissolving ferrochrome in sulphuric acid and mother liquor from the subsequent crystallization of ammonium chrome alum, optionally with the addition of at least one of catholyte and anolyte overflow from the subsequent electrolysis,
(b) removing undissolved constituents by filtration,
(c) removing dissolved iron by the addition of at least one of ammonia and ammonium sulphate to the filtrate obtained, crystallizing iron ammonium sulphate and filtering,
(d) crystallizing and filtering ammonium chrome alum from the remaining solution and returning the filtrate for dissolving ferrochrome in step (a),
(e) dissolving the ammonium chrome alum in water,
(f) precipitating and separating chromium-(III) hydroxide from the resulting solution by adding a base, optionally under reducing conditions,
(g) dissolving the separated chromium hydroxide in chromic acid and optionally sulphuric acid so that either a single solution in chromic acid is obtained or two solutions are obtained, one in chromic acid and another in sulphuric acid,
(h) separating the solution(s) from undissolved constituents, and
(i) utilizing the solution of chromium hydroxide in chromic acid as anolyte in the electrolytic production of chromic acid in an electrolytic cell divided by a membrane, and either utilizing the same solution as catholyte in the above mentioned electrolytic cell divided by a membrane or utilizing the solution of chromium hydroxide in sulphuric acid as catholyte in the above mentioned electrolytic cell divided by a membrane, hydrogen and metallic chromium being deposited electrolytically at the cathode and/or chromium (II) ions being produced electrolytically at the cathode.

5 Claims, 1 Drawing Sheet

PROCESS FOR THE PREPARATION OF CHROMIC ACID

This invention relates to a process for the electrolytic preparation of chromic acid.

According to "Ullmann's Encyclopedia of Industrial Chemistry, Fifth Edition, Vol. A 7, VCH Verlagsgesellschaft mbH, Weinheim, 1986, pages 67-81", the industrial production of chromic acid is carried out by three different processes. For the preparation of sodium dichromate, chromium ore is roasted with sodium carbonate and/or sodium hydroxide and atmospheric oxygen. The clinker removed from the furnace used for this roasting is leached with water and/or a chromium-containing solution. After the mash has been adjusted to a pH of 7 to 9.5 with sulphuric acid and/or sodium dichromate solution, the sodium monochromate solution obtained is freed from insoluble constituents of chromium ore by filtration. The chromium-containing residue obtained must then be subjected to a complicated working up process.

For the preparation of sodium dichromate, the chromate ions in the solution are converted into dichromate ions by acidification with sulphuric acid and/or by acidification with carbon dioxide under pressure. Sodium sulphate containing chromate is inevitably formed in the process and must be worked up.

For the preparation of chromic acid by the so-called wet process, the sodium dichromate solution is concentrated and sulphuric acid is added to the solution so that chromic acid crystallizes.

In the so-called melt or dry process, sodium dichromate crystals are reacted with concentrated sulphuric acid in a molar ratio of approximately 1:2 at temperatures of about 200° C. Both processes have in common the inevitable formation of sodium bisulphate contaminated with chromate either as a solvent-free melt or as an aqueous solution.

This disadvantage is avoided in the third process, i.e. the electrolysis of sodium dichromate in aqueous solution as described, for example, in DE-C 3 020 260 or in CA-A 739 447.

A process for the preparation of chromic acid has now been found which does not have the disadvantages which occur in the above mentioned processes due, for example, to the use of sodium dichromate.

The present invention relates to a process for the production of chromic acid, characterized by a) the dissolving of ferrochrome in sulphuric acid and mother liquor from the crystallization of ammonium chrome alum, optionally with the addition of catholyte and/or anolyte overflow from the electrolysis,
b) removal of undissolved constituents by filtration,
c) removal of dissolved iron by the addition of ammonia and/or ammonium sulphate to the filtrate obtained, crystallization of iron ammonium sulphate and filtration,
d) crystallization and filtration of ammonium chrome alum from the remaining solution and return of the filtrate to the stage of dissolving the ferrochrome,
e) dissolving of ammonium chrome alum in water,
f) precipitation and separation of chromium(III) hydroxide from the resulting solution by means of a base, optionally under reducing conditions,
g) dissolving of the separated chromium hydroxide in chromic acid and optionally sulphuric acid in such a manner that either a single solution in chromic acid is obtained or two solutions are obtained, one in chromic acid and another in sulphuric acid,
h) separation of the solution(s) from undissolved constituents, and
i) use of the solution of chromium hydroxide in chromic acid as anolyte for the electrolytic production of chromic acid in electrolytic cells divided by membranes and either the use of the same solution as catholyte in the above mentioned electrolytic cells divided by membranes or use of the solution of chromium hydroxide in sulphuric acid as catholyte in the above mentioned electrolytic cells divided by membranes, hydrogen and metallic chromium being deposited electrolytically at the cathode and/or chromium(II) ions being electrolytically produced at the cathode.

Suitable conditions for the cathodic deposition of elementary chromium are described, for example, in "J. B. Rosenbaum, R. R. Lloyd, C. C. Merrill Electrowinning Chromium Metal, U.S. Bur. of Mines Report of Investigation 5322, U.S. Dep. of the Interior, 1957". This requires a raising of the pH, for example by the addition of ammonia. At lower pH values, reduction to chromium(II) ions preferentially takes place at the cathode.

A carbon-containing ferrochrome, i.e. a high carbon ferrochrome or a charge grade ferrochrome, is used as starting material. Those carbon-containing ferrochromes which have a high chromium iron ratio are particularly advantageous.

Precipitation of chromium(III) hydroxide is brought about by raising of the pH of the ammonium chrome alum solution to about 3-6 by the addition of bases. Ammonia, alkali metal hydroxides, alkali metal salts of weak or medium strong acids and alkaline earth metal oxides, hydroxides and carbonates are suitable bases for this purpose. Ammonia, sodium hydroxide, sodium carbonate and aqueous solutions thereof are preferred. Precipitation of the chromium(III) hydroxide is preferably carried out at an elevated temperature. Its separation is carried out by filtration or centrifuging which should be aimed at extensive removal of the mother liquor adhering to the chromium hydroxide.

In the preferred variation of the process according to the invention, the precipitation of chromium(III) hydroxide is carried out under reducing conditions and with the exclusion of atmospheric oxygen. Sulphur dioxide, sulphurous acid and its salts, chromium(II) salts, hydrazine, hydroxylamine as well as electric current, e.g. on solid bed cathodes of carbon particles, are suitable reducing agents.

The precipitation of chromium hydroxide is preferably carried out in two stages, impure chromium hydroxide being precipitated in the first stage. This chromium hydroxide is used for dissolving ferrochrome after it has been separated. Only in the second stage precipitated and separated and optionally washed chromium hydroxide is dissolved in a solution containing sulphuric acid and/or chromic acid and used for the electrolytic production of chromic acid and metallic chromium.

The proportion of impurities in chromium(III) hydroxide may be further reduced by washing with water or aqueous solutions.

The chromium hydroxide may, if desired, be reprecipitated for further purification by dissolving it in acid and again precipitating it by raising the pH. For even greater purity, the impurities, in particular iron, may be extracted from the acid solution by known processes, for example with phosphates or phosphonates.

Chromium hydroxide obtained by these means is also suitable for the preparation of chromium(III) salts such as chromium(III) acetate, nitrate, sulphate and formate and for the preparation of chrome tanning substances.

The separated chromium hydroxide is then completely or partly dissolved in chromic acid solution consisting of all or part of the chromic acid solution from the anode compartments of the electrolytic cells. This solution of chromium hydroxide in chromic acid freed from insoluble constituents is introduced into the anode compartments of the electrolytic cells for partial or almost complete conversion of the chromium(III) contained therein into chromic acid. If the separated chromium hydroxide has been completely dissolved in chromic acid, this solution is also introduced into the cathode compartments of the electrolytic cells. For improving the current yield in the deposition of metallic chromium, this stage may advantageously be preceded by a chemical reduction of the chromium(IV) in the solution by means of sulphur dioxide combined with the addition of sulphuric acid. On the whole, however, the portion of chromium hydroxide used for charging the cathode departments is preferably directly dissolved in sulphuric acid so that no further reduction is necessary and the solution separated from insoluble constituents may then be directly introduced into the cathode chambers.

The solution of chromium(III) sulphate in sulphuric acid may be purified by known methods for further reducing the proportion of impurities, for example by extraction of the impurities with acid phosphoric acid esters or acid phosphates or acid phosphonates.

Electrolysis may, alternately, be carried out with introduction of ammonium chrome alum solution into the cathode compartments and introduction of the solution of chromium hydroxide into the anode compartments.

An overflow from the cathode chambers is returned into the solution obtained by dissolving ferrochrome in sulphuric acid, optionally after reduction of any components in the overflow still be capable of oxidation, for example by means of sulphur dioxide. If desired, part of this overflow may also be introduced into the solution of chromium(III) salt in chromic or sulphuric acid obtained by dissolving the chromium hydroxide in acid and used for charging the cathode chambers.

If electrolysis is operated in such a manner that chromium(II) ions are present in the catholyte circulation, the overflow of catholyte is partially or completely added to the crystallization of ammonium chrome alum. The catholytes containing chromium(II) ions may also be used for the reduction of organic compounds. Such reductions are described, for example, in "J. R. Hanson and E. Premuzic, Zeitschrift für Angewandte Chemie, Year 80, 1968, No. 7, pages 271 to 276".

The chromic acid solution produced in the anode chambers is removed and partly or completely utilized as chromic acid, either in the form of the solution removed from the anode chambers or in the form of solid chromic acid. To produce solid chromic acid, the solution is generally concentrated by evaporation so that chromic acid crystallizes. Crystallization is preferably carried out at an elevated temperature. The mother liquor left behind after crystallization of the chromic acid and still containing dissolved chromic acid may be used again for dissolving chromium hydroxide. The maximum amount of chromic acid which can be removed from the process is, of course, not greater than the amount produced electrolytically, and an almost constant amount of chromic acid must always be available for dissolving the chromium hydroxide. If the solution set aside for the cathode chambers is also produced by dissolving chromium hydroxide in chromic acid, the total amount of chromic acid which can be removed from the process is decreased by the amount destroyed by reduction.

To prevent the accumulation of impurities in the anode chambers, part of the chromic acid solution produced or part of the mother liquor remaining after crystallization of the chromic acid may be discharged or subjected to purification. This purification may be carried out, for example, by reducing the chromium(VI), e.g. with sulphur dioxide, optionally with the addition of sulphuric acid, and returning the resulting solution to the stage of dissolving of the ferrochrome or into the solution obtained after the ferrochrome has been dissolved.

In one particularly preferred variation of the process, part of the anolyte solution containing chromic acid and optionally sulphuric acid leaving the anode chambers is used for dissolving chromium hydroxide, another part is worked up into chromic acid solution and/or chromic acid crystals and a third part is discharged and then used for dissolving ferrochrome after reduction with sulphur dioxide.

If a very high degree of purity is required, the proportion of anolyte solution to be discharged is chosen so that the proportion of foreign ions in the electrolyte circulation is kept low. This proportion of anolyte solution to be discharged may be up to 10% of the total quantity of anolyte solution produced, the quantity of chromic acid which can be isolated being reduced correspondingly.

Diaphragms, anion exchanger membranes and cation exchanger membranes may be used for separating the anode and cathode chambers of the cells. Cation exchanger membranes having a perfluorocarbon polymer structure with sulphonate exchange groups are preferably used. Such membranes are available commercially, for example from DuPont, USA under the name of ®Nafion. Examples of suitable membranes include (®)Nafion 117, 324, 417, 423 and 430.

The electrolytic cells used are preferably frame cells of the so-called filter press type. If metallic chromium is produced at the cathode side, these cells are preferably constructed in that way that the cathode plates can easily be removed from the cell after the deposition of metallic chromium. Materials which are resistant to chromic acid solution are suitable for the construction of the electrolytic cells, in particular titanium and chlorinated PVC (C-PVC) and PVDF.

Various materials may be used as cathode plates, e.g. graphite, lead, copper, nickel, brass and alloys thereof. Cathode plates of stainless steel are preferred.

The electrodes used at the anode side preferably have an electrocatalytically active layer with a high oxygen over-voltage such as, for example, electrodes of lead, lead alloys or hardened lead dioxide. Such anodes are described, for example, in DE-A 2 619 426.

Electrodes of a valve metal such as titanium, niobium or tantalum or of graphite coated with lead dioxide are particularly preferred. Anodes of this type are described, for example, in DE-A 2 714 605 and in U.S. Pat.

No. 4,236,978. These anodes may have a conductive interlayer between the valve metal and the lead dioxide layer. This interlayer may consist of one or more metal oxides, e.g. oxides of platinum metals, oxides of titanium, tantalum or vanadium and of other non-noble metals or they may consist of noble metals such as platinum or iridium deposited by wet electroplating or electroplating from molten salts.

The anodes may be constructed, for example, as plate electrodes, stretch metal anodes, so-called knife anodes, so-called spaghetti anodes or louvre type anodes.

Solid bed anodes are used in one advantageous variation of the process. These anodes may be composed, for example, of a bed of lead balls, titanium balls, particles of titanium sponge or particles of graphite or a porous sintered titanium metal with lead dioxide deposited on their surface The balls or particles have a diameter of from 1 to 10 mm, preferably 2 to 5 mm. This arrangement ensures almost complete oxidation of chromium-(III) to chromic acid in the anode chamber of the cells with a high anodic current yield and high volume/time yield.

The electrolytic cells are operated at temperatures from 25° to 85° C., preferably from 50° to 80° C.

The electrolytic cells have anolyte and catholyte circulations in which the electrolytes are rapidly pumped round.

Fresh electrolyte prepared by dissolving chromium hydroxide in a solution containing sulphuric acid and/or chromic acid is continuously added to these circulations. Overflowing anolyte containing chromic acid is returned to the process or worked up into chromic acid solution and/or chromic acid crystals as already described. The catholyte overflow is returned to the process, preferably to the crystallization of ammonium chrome alum, with partial or complete oxidation of the chromium(II) ions to chromium(III) ions by atmospheric oxygen.

If metallic chromium is to be produced cathodically, a total chromium concentration of from 20 to 60 g/l and a pH of from 1 to 2.8, preferably from 2.1 to 2.8, is maintained for obtaining high deposition rates of metallic chromium and high current yields in the catholyte circulation. This may be achieved, for example, by means of the quantity of fresh electrolyte introduced into the catholyte circulation and the quantity of acid contained in the electrolyte, by the independent addition of bases or acids or by varying the cathodic current density within the given limits. The total chromium concentration in the anolyte circulation may be from 20 to 700 g/l.

Electrolysis is carried out at cathodic current densities of from 0.3 to 3 kA/m$^2$, preferably from 0.3 to 1.7 kA/m$^2$. When solid bed anodes are used, the anodic current densities are from 1 to 15 A/m$^2$, preferably from 4 to 8 A/m$^2$ of the anode surface.

The process according to the invention enables chromic acid to be prepared without the formation of by-products containing chromium(VI).

The process according to the invention will now be explained in more detail with reference to FIG. 1 which is a flow sheet of a particularly advantageous embodiment.

Ground high carbon ferrochrome is dissolved at boiling temperature (1) with concentrated sulphuric acid, mother liquor from the crystallization of ammonium chrome alum (5), (6) and optionally discharged and reduced anolyte (18) and catholyte overflow. The resulting solution is cooled to about 80° C. by the addition of cold mother liquor from the working up of ammonium iron sulphate (21) and freed from undissolved, silicon-containing residue by filtration (2). This residue is freed from soluble constituents by washing with water and removed from the process. The wash water is returned to the leaching process (1). A major proportion of the iron is then removed from the solution by crystallization of iron ammonium sulphate (3). For this purpose ammonia gas or ammonia solution and/or ammonium sulphate is added and the solution is kept at a temperature of about 50° to 80° C. for several hours. The reaction time should be at least one hour.

Ammonium iron sulphate is then crystallized from this solution by rapid cooling to 5°-10° C. and removed from the solution by filtration (4). The chromium-containing ammonium iron sulphate is freed from most of its chromium by recrystallization and carried away (21) for industrial utilization.

The solution now free from most of its iron is heated to about 30° C. and aged at this temperature for some time (5). The ammonium chrome alum which crystallizes from this solution is filtered and washed with cold water (6). Part of the mother liquor and of the wash water is returned to the leaching process (1) and another part is discharged. Sodium hydroxide solution and/or sodium carbonate is added to the discharged portion to bring about almost complete precipitation of chromium hydroxide (19) which is separated from the ammoniacal sodium sulphate solution by filtration (20) and returned to (1). The ammoniacal sodium sulphate solution is freed from ammonia by stripping and worked up to yield crystalline sodium sulphate (24) which is removed for industrial utilization. The ammonia obtained in the process is used for the crystallization (3) and/or the precipitations (8) and (10).

The washed crystals of ammonium chrome alum are then dissolved in hot water (7) and transferred to the two-stage chromium hydroxide precipitation where ammonia solution or ammonia gas is added to the solution which has been heated to 60° to 90° C. until the solution is at a pH of about 3.0 to 4.0 (8). The chromium hydroxide which precipitates is separated off (9) and returned to the leaching stage (1). It is advantageous to add a small quantity of oxidizing agent, preferably anolyte containing chromic acid, to the ammonium chrome alum solution prior to the precipitation of chromium hydroxide (8).

Chromium hydroxide is then precipitated (10) by the further addition of ammonia at 60° to 90° C., preferably at 80° C., and at a pH of 4.5 to 6.0, preferably 5, and the precipitate is filtered (11) and washed. The filtrate and the wash water obtained are returned to the process, for example upstream of the crystallization (3) and/or into the precipitation (19).

For preparing the solution for the anolyte supply (16), the aqueous chromium hydroxide which has been separated off is then dissolved (12) in anolyte solution containing chromic acid and/or in mother liquor from the working up of chromic acid (23) and is optionally freed from undissolved constituents by filtration (13). The residue of filtration (13) is returned to the leaching process (1) via the reduction (18).

For preparing the solution for the catholyte supply (15), aqueous chromium hydroxide which has been separated off is dissolved in sulphuric acid (14) and optionally freed from undissolved constituents by filtration (13).

After the electrolytes have been adjusted to the optimum concentrations for the electrolytic process by the addition or evaporation of water and the pH values have been adjusted by the addition of chromium hydroxide and/or sulphuric acid and/or anolyte solution containing chromic acid, the electrolytes are introduced into the anolyte and catholyte circulations of the cells by way of the anolyte container (16) and the catholyte container (15), the latter optionally after reduction with sulphur dioxide and the addition of sulphuric acid.

Electrolysis (17) is now operated in such a manner that a total chromium concentration of from 10 to 100 g/l and pH values below 1 are established in the catholyte circulation. This is carried out by adjusting the quantity of electrolyte supplied from the container (15) and adjusting the cathodic current density in the range of from 0.05 to 0.8 kA/m$^2$ or by the addition of sulphuric acid. The temperature of electrolysis of from 50° to 80° C., most preferably about 60° C., is adjusted by heat exchangers in the anolyte and catholyte circulation. The overflow from the catholyte circulation is returned to the process by introduction into the ageing stage (5). Any metallic chromium separated off is introduced into the leaching vessel (1).

For the simultaneous production of chromic acid and metallic chromium, electrolysis is carried out in such a manner that pH values of from 2.1 to 2.8 and total chromium concentrations of from 20 to 60 g/l are established in the catholyte circulation. These pH values are adjusted by the addition of ammonia or some other base. The cathodic current density is adjusted to values from 0.3 to 1.7 kA/m$^2$ and the temperature of electrolysis to a value from 50° to 80° C., preferably 60° C. For obtaining high cathodic current yields, the catholyte circulation is operated with exclusion of atmospheric oxygen, for example by covering with nitrogen.

After an electrolysis time of about 50 to 100 hours, the cathode plates covered with deposited metallic chromium are removed from the cells and freed from metallic chromium. The metallic chromium obtained is then worked up into a marketable product by known processes (22).

The overflow from the anolyte circulation containing chromic acid is used for dissolving chromium hydroxide (12) and for the preparation of chromic acid solution and chromic acid crystals (23). To avoid accumulation of impurities in the anolyte circulation, part of the anolyte solution is returned to the leaching stage (1) after reduction with sulphur dioxide (18).

For the preparation of chromic acid solution, the anolyte solution is adjusted to a concentration of about 50% $CrO_3$ by evaporation of addition of water, optionally after the oxidation of chromium(III) residues with peroxydisulphates.

Chromic acid crystals suitable for sale on the market are obtained from this solution by evaporation of water in a vacuum, centrifuging, washing with water and drying. The mother liquor obtained from centrifuging and the wash solution are used for the leaching process (1) after reduction with sulphur dioxide (18) and/or they are used for dissolving chromium hydroxide (12) without previous reduction.

It is understood that the specification and examples are illustrative but not limitative of the present invention and that other embodiments whithin the spirit and scope of the invention will suggest themselves to those skilled in the art.

What is claimed is:

1. A process for the production of chromic acid, comprising
   (a) disolving ferrochrome in sulphuric acid and mother liquor recycled from the subsequent crystallization of ammonium chrome alum, optionally with the addition of at least one of catholyte and anolyte overflow from the subsequent electrolysis,
   (b) removing undissolved constituents by filtration,
   (c) removing dissolved iron by the addition of at least one of ammonia and ammonium sulphate to the filtrate obtained,
   (d) crystallizing and filtering ammonium chrome alum from the remaining solution and returning the filtrate for dissolving ferrochrome in step (a),
   (e) dissolving the ammonium chrome alum in water,
   (f) precipitating and separating chromium-(III) hydroxide from the resulting solution by adding a base, optionally under reducing conditions,
   (g) dissolving the separated chromium hydroxide in chromic acid and optionally sulphuric acid so that either a single solution in chromic acid is obtained or two solutions are obtained, one in chromic acid and another in sulphuric acid,
   (h) separating the solution(s) from undissolved constituents, and
   (i) utilizing the solution of chromium hydroxide in chromic acid as anolyte in the electrolytic production of chromic acid in an electrolytic cell divided by a membrane, and either utilizing the same solution as catholyte in the above mentioned electrolytic cell divided by a membrane or utilizing the solution of chromium hydroxide in sulphuric acid as catholyte in the above-mentioned electrolytic cell divided by a membrane, hydrogen and metallic chromium being deposited electrolytically at the cathode and/or chromium (II) ions being produced electrolytically at the cathode.

2. A process according to claim 1, wherein in step (f) the precipitation of chromium hydroxide is effected with ammonia in two stages, impure chromium hydroxide being precipitated in the first stage and transferred, after its separation, to the stage of dissolving ferrochrome, and chromium hydroxide precipitated and separated in the second stage, optionally washed, being dissolved with solution containing sulphuric acid and/or chromic acid and used in the electrolytic production of chromic acid and metallic chromium.

3. A process according to claim 1, wherein in step (f) the base used is at least one of ammonia, sodium hydroxide, sodium carbonate or an aqueous solution thereof.

4. A process according to claim 1, wherein one part of the anolyte solution leaving the cell in step (g), which solution contains chromic acid and optionally sulphuric acid, is used for dissolving chromium hydroxide, another part is worked up to form at least one of chromic acid solution and chromic acid crystals, and a third part is used for dissolving ferrochrome after its reduction with sulphur dioxide.

5. A process according to claim 1, wherein a perfluorinated cation exchanger membrane with sulphonate exchanger groups is used for the separation of anode and cathode chambers or cells.